A. B. HAZARD.
INDICATOR.
APPLICATION FILED JUNE 22, 1911.
1,093,621.
Patented Apr. 21, 1914.
2 SHEETS—SHEET 1.
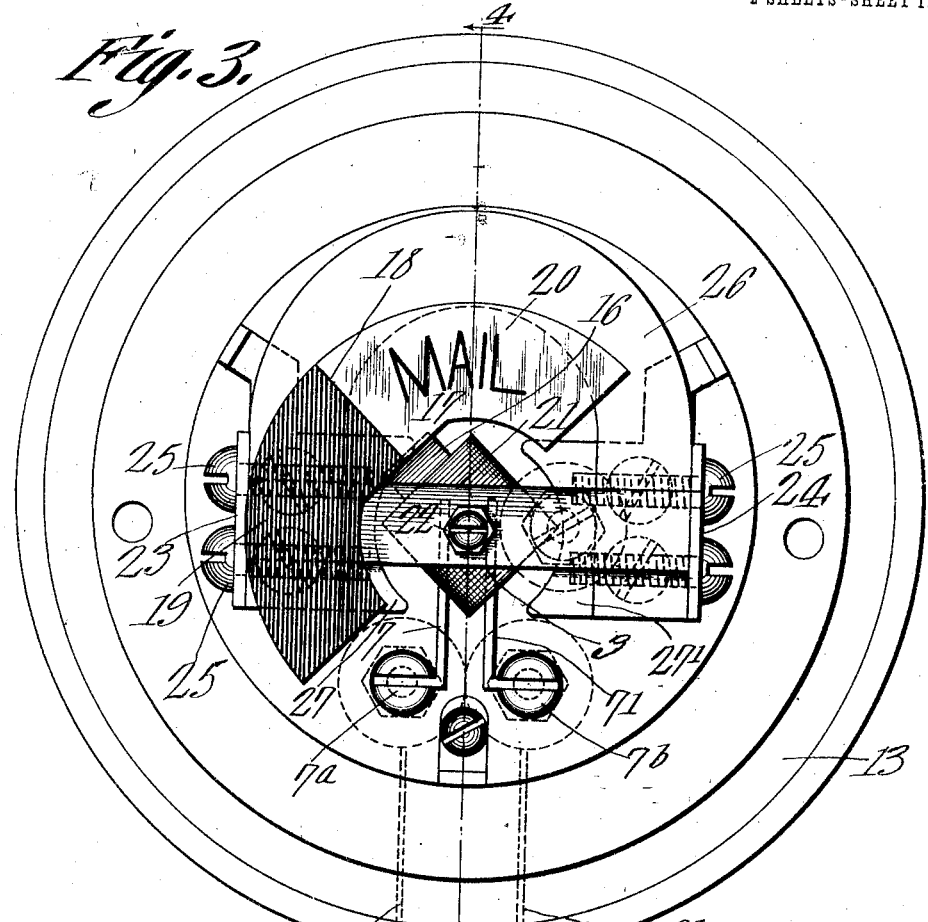
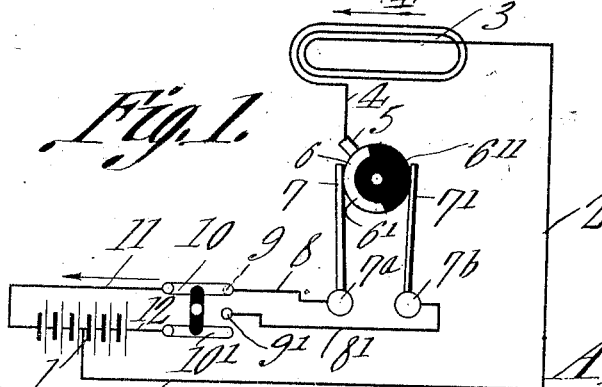
Witnesses
A. B. Hazard,
Inventor
by
Attorneys A. B. HAZARD.
INDICATOR.
APPLICATION FILED JUNE 22, 1911.
1,093,621.
Patented Apr. 21, 1914.
2 SHEETS—SHEET 2.
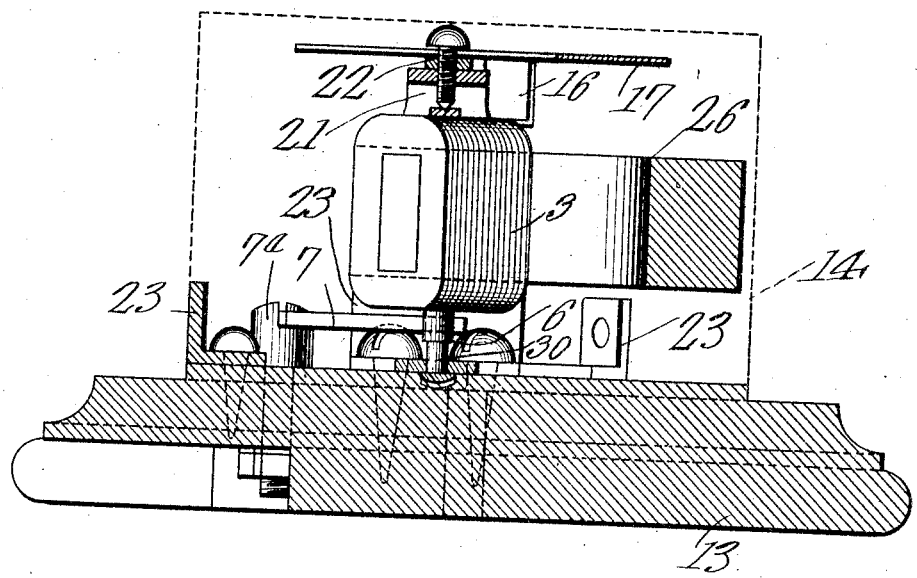
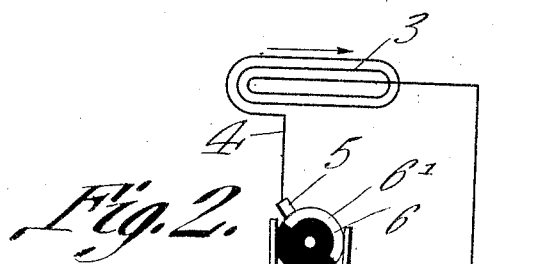
Witnesses
A. B. Hazard,
Inventor
by C. A. Snow & Co.
Attorneys

UNITED STATES PATENT OFFICE.

ALLEN BARBER HAZARD, OF CHICAGO, ILLINOIS, ASSIGNOR OF ONE-HALF TO RICHARD E. HUMPSTON, OF CHICAGO, ILLINOIS.

INDICATOR.

1,093,621.  Specification of Letters Patent.  Patented Apr. 21, 1914.

Application filed June 22, 1911. Serial No. 634,761.

*To all whom it may concern:*

Be it known that I, ALLEN B. HAZARD, a citizen of the United States, residing at Chicago, in the county of Cook and State of Illinois, have invented a new and useful Indicator, of which the following is a specification.

This invention relates to improvements in indicators, the primary object of the invention being the provision of an electrically operated means whereby the condition of certain mechanisms may be indicated, such for instance, as apparatus at distance points, such as oil switches, circuit breakers, mail boxes, and coin collecting machines; this particular apparatus being provided with means whereby when any of the above mentioned devices are operated that the indicator controlled thereby, will properly indicate the exact condition of the apparatus to which it is connected.

A further object of the invention is the provision of an armature and target operably connected therewith, combined with a magnet, whereby the target which in this case, is a segmental target 180° in length, so mounted that when indicating one condition of the apparatus, 90° or one half of the target will be exposed while the remaining 90° will be hidden, and vice versa.

Briefly stating, this invention comprises an armature equipped with a commutator, having a 180° segment mounted so that only one of a pair of brushes makes contact with the segment at a time, one end of the armature winding being connected to the segment while the other is connected to a supporting frame. The brushes are connected to positive and negative terminals of two or more batteries as may be desired, and a frame connection is made to the middle battery so that there will be as many batteries between it and the positive connection, as there are between it and the negative connection. By this means the battery current is sent through the armature from the frame connection to the negative brush, the armature, providing same is in a position to make contact with negative brush, will then turn through an angle of 90°, bringing that part of the target before invisible to view.

The device is so constructed that when the armature has passed through an angle of about 75°, the contact between the brush and commutator is broken, stopping the flow of battery current. Should the battery current be sent through the armature from the positive brush to the frame, the armature will turn through an angle of 90° in the opposite direction breaking contact after having passed through an angle of about 75° as above mentioned, this movement of the armature carrying its target and exposing to view alternately the different halves or 90° portion of the target.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a diagrammatic view showing the position the armature assumes when in contact with the negative brush, the current passing in the direction of the arrow during this period. Fig. 2 is a similar view with the armature segment in contact with the positive brush, the current in this case flowing in the direction of the arrow as indicated. Fig. 3 is a top plan view of an indicator used in connection with this circuit, the cover thereof being removed. Fig. 4 is a section taken on the line 4—4 of Fig. 3 with the cover shown in dotted lines.

Referring to the drawings, the numeral 1 designates the batteries, which are arranged in series and are connected centrally of their ends by a conductor 2, so that a similar number of batteries will be upon each side of said connections. The conductor 2 is connected to a frame, and to the coil 3, the wires 4 being connected to a plate 5, to which the armature 6 is journaled, said armature being provided with the curved contact segment, 6′, said segment being a 180° segment, the remaining portion of said armature being composed of a 180° block of insulation 6″. Adapted to contact the commutator are the two brushes 7 and 7′, the brush 7 being the negative brush and the brush 7′ being the positive brush, the said brushes being connected respectively to the posts 7ª and 7ᵇ, and leading from said posts are the conductors 8 and 8′ respectively. The conductor 8 is connected to a switch contact point 9, while the conductor 8″ is connected to a switch contact point 9′. The double pivoted switch points 10 and 10′, respectively, are connected to their respective conductors 11 and 12, the conductor 11 being connected to the left hand series of batteries 1, while the conductor 12 is connected to the right hand series of batteries 1.

By reference to Fig. 1 of the drawings, it will be seen that the switch member 10 is in contact with the switch contact point 9, and when in this position, the current will flow in the direction of the arrow, while as indicated in Fig. 2 of the drawings, the switch contact member 10′ is in contact with the switch contact point 9′, the electric current in this case following the direction of the arrow which is reversed to the direction as indicated in Fig. 1 of the drawings.

The principle employed in this invention is as follows: There are a certain number of lines of magnetic force extending across the magnet from the north pole to the south pole. When a current is sent through the armature, lines of force are set up around the same, in a direction depending on the direction of the current, all lines of force that coincide tending to place themselves parallel to and in the same direction. As the magnet 26, is stationary, the armature will turn so that its lines of force will be parallel to and in the same direction as those in the magnet, hence the movement of said armature and its target 17, will move either to the right or to the left, when the magnet is energized in the proper direction.

To more particularly bring out the features of this invention, Figs. 3 and 4 of the drawings, illustrates and shows a construction of assembled mechanism, to indicate conditions for instance of a mail box, that is to show whether or not it contains or does not contain mail matter. In this instance a circular base of insulating material, such as 13, is employed, and mounted removably to protect and cover the mechanism carried thereby, is a cylindrical cover 14, the said cover being provided with a 90° aperture therein, the purpose of which will presently appear.

As shown the wires 8 and 8′ lead through this block and are connected to the posts 7ª and 7ᵇ respectively of the brushes 7 and 7′ respectively, the said brushes being mounted upon the base 13 as clearly indicated in Figs. 3 and 4 of the drawings. Rotatably mounted upon the base, is the armature 6, which as before set forth is provided with the metal segment 6′ and with the insulating segment 6″, and carries rotatably therewith, the coil 3, which carries at its top the bracket 16, to which is connected the curved strip or 180° segmental target 17, the said target 17, being divided centrally as at 18 into the 90° segments or indicators 19 and 20, respectively; the aperture in the top of the cover 14; being of sufficient size, to exhibit the indications of either one of the portions 19 or 20 through the cover, so that as the said target is moved to right or left, as indicated in Fig. 3 of the drawings, one or the other of said indicators will be in visual view.

The coil 3 and armature 6 are properly supported upon the lower stationary pivot 30, and the upper adjustable screw 22 carried by the bracket or plate 21. This plate 21 is carried by the brackets or plates 23 and 24, one of which also provides a limiting means for the bracket 16 to prevent the target from moving any farther at the left than as viewed in Fig. 3, while the other plate 24 at the right will limit the movement of the bracket 16 and consequently the target in that direction. Thus the target due to the flow of current through the coil 3 as illustrated in the diagram Figs. 1 and 2, will be halted in its movement by the bracket 16 and the respective plates 24, and when the current has been shifted to flow in either one of the directions, said direction being an opposite direction to that initially imparted to the target, so that the said target is permitted a movement of substantially 90°.

Secured to the base 13 by means of the brackets 23 and 24, and the set screws 25, is the horseshoe shaped permanent magnet 26, which is provided with the oppositely disposed segmental portions 27 and 27′, which constitute the north and south poles of the said permanent magnet 26.

By this construction as now set forth, it will be seen that as the current passes as indicated by the arrows in Fig. 1 of the drawings, the armature 6 will be moved to the position as shown in Fig. 3, the target being stopped in its movement by the contact of the bracket 16 with the bracket or plate 24. This movement is produced by closing the switch 10, the current flowing from the center of the battery at 1 through the conductor 2 to the coil 3, and the conductor 4 to the commutator connection 5, this action moving the target from the right to left as viewed in Fig. 3, as the current is caused to flow from said commutator connection 5 through the segment 6′ to the brush 7, the conductor 8, terminal 9, switch 10 and conductor 11 to the other side of the battery.

Should the switch be moved so that the switch 10′ as shown in Fig. 2 will engage the terminal 9′, at which time the current will flow in the opposite direction to rotate the armature or target from the position as shown in Fig. 2 to the position as shown in Figs. 1 and 3, where the black portion of the target will assume the position of the lighter portion, as shown in Fig. 3, the bracket 16 abutting the plate 24 at the right and being stopped in its movement by such plate similarly to the stoppage when moved in the reverse direction. The circuit which is closed when the switch 10' bridges the terminal 9' is as follows: the batteries, conductor 12, switch 10', conductor 8', the brush 7', the armature segment 6', the commutator connection 5, the conductor 4, the coils 3 and the conductor 2 to the central portion of the battery. By this means it will be seen that the flow of the current relatively to the coil 3 is reversed, without affecting the flow of current in the batteries, this action serving to rotate the armature and consequently the target 18, to the left as viewed in Fig. 3 when the switch 10 is closed, or to the right when the switch 10' is closed.

It will thus be seen that the assembled device, or the construction as illustrated in Figs. 3 and 4 of the drawings, consists of a magnet and an armature, carrying a target, the working parts being inclosed by a cover provided with an aperture through which is shown 90° of the target, and as said target consists of a segment of 180°, only one half of the same is exposed to view at a time, the target remaining at rest with either half showing through the opening in the cover.

The armature being equipped with a commutator which consists of one 180° segment mounted so that only one of the pair of the brushes 7 or 7' is in contact with the same at a time, the armature winding being connected to the segment, and the other end to the frame, it is evident that the brush when connected to the positive terminal batteries, will cause the target to move in one direction, and while connected to the negative terminals will cause the target to move in the opposite direction. Thus when the battery current is sent through the armature from the frame connection to the negative brush, the armature being in contact with the negative brush, will turn through an angle of 90°, so as to bring that part of the target before invisible to view through the aperture in the hood or cover 14.

The device is so constructed that when the armature has passed through an angle about 75°, the contact between the brush and the commutator is broken, stopping the flow of the battery current, this occurring in either direction of movement of the said armature and its segmental target. By this means it is evident that any remote piece of apparatus, such as an oil switch, circuit breaker, or an indicator for indicating various purposes may be connected so as to indicate through this apparatus the condition thereof. In this particular instance where the assembled device is used in connection with letter boxes, in apartment houses for instance, should a letter be inserted in the box, the indicator will be actuated causing the target to indicate a word that will indicate to the parties whether there is mail in the box, and when the door of the box is opened to remove the mail, the indicator will be returned to indicate that the box is empty.

What is claimed is:

1. The combination with a series of cells, two conductors, one leading from each end cell thereof, a conductor leading from the center cell of said series, and a two point switch for connecting one of the two first named conductors at a time to the center conductor to close one circuit at a time, of a permanent magnet, an armature capable of oscillatory movement disposed between the poles of said magnet and connected with the center conductor, a commutator having a contact portion carried by the armature two brushes one connected to each of the two points of the switch, and adapted to contact alternately the contact portion of the commutator, and a target carried by said armature, whereby said switch connects the brushes alternately with the respective two conductors and determines the direction of flow of the current from the cells to the armature, and whereby the circuit through the armature is alternately made by way of the contact segment of the commutator and one of the brushes.

2. The combination with a battery, a conductor leading from the center cell thereof, two auxiliary conductors, one leading from each end cell thereof, and a two point switch having its separate members connected to the respective auxiliary conductors and contacts engageable by the respective members, of an indicating mechanism, comprising two brushes, each one of said brushes being connected to its respective contact of the switch, an armature having a coil and a commutator, the contact portion of the commutator being a 180° segment, the contact portion of said commutator being connected to the center conductor and for alternate contact with said brushes the coil of the armature being interposed in the center conductor, an indicating device carried by said armature, and a permanent magnet, the poles of which are disposed diametrically opposite to said armature, whereby the switch may be manipulated to alternately connect the brushes with the cells to cause the armature to be oscillated.

3. The combination with a battery, a conductor leading from the center cell thereof, two auxiliary conductors, one leading from each end cell thereof, and a two point switch having its separate members connected to the respective auxiliary conductors and contacts engageable by the respective members, of an indicating mechanism, comprising two brushes, each one of said brushes being connected to its respective contact of the switch, an armature having a coil and a commutator, the contact portion of the commutator being a 180° segment, the contact portion of said commutator being connected to the center conductor and for alternate contact with said brushes the coil of the armature being interposed in the center conductor, an indicating device carried by said armature, and a permanent magnet having its poles straddling but out of contact with said armature, whereby the switch may be manipulated to alternately connect the brushes with the cells to cause the armature to be oscillated.

4. The combination with a battery, a main conductor led from the center cell thereof, and two auxiliary conductors led from the respective end cells of the battery, and a reversing switch having separate members permanently connected to the respective auxiliary conductors and contacts engageable by the respective members, of an indicating mechanism, comprising a base, a permanent horse-shoe magnet mounted rigidly thereon, an armature capable of an oscillatory movement disposed between the poles of said permanent magnet, a commutator carried thereby, said armature being connected to the main conductor, two brushes in contact with said commutator and alternately engaging the contact portion thereof, each brush being connected to its contact, said reversing switch connecting the brushes alternately with a portion of the battery, an arm carried by the upper portion of the armature, and a 180° segmental target carried by said arm.

In testimony that I claim the foregoing as my own, I have hereto affixed my signature in the presence of two witnesses.

ALLEN BARBER HAZARD.

Witnesses:
RICHARD E. HUMPSTON,
ANTHONY A. POLKER.